Feb. 3, 1931.   P. B. SHEE   1,791,250

SEPARATOR

Filed April 5, 1930

Inventor:
Parke B. Shee
By Christoph Parker Carlson
Attys

Patented Feb. 3, 1931

1,791,250

UNITED STATES PATENT OFFICE

PARKE B. SHEE, OF OAK PARK, ILLINOIS, ASSIGNOR TO SEARS, ROEBUCK AND CO., OF CHICAGO, ILLINOIS, A CORPORATION OF NEW YORK

SEPARATOR

Application filed April 5, 1930. Serial No. 441,786.

The invention relates generally to a centrifugal separator and more particularly to the bowl assembly of such a separator.

The general object of the invention is to provide a novel bowl assembly, the parts of which may be securely locked together and are rigidly held in place against any tendency to become distorted or to become disassembled due to the high speed of rotation of the assembly.

Other objects and advantages will become apparent from the following description taken in connection with the accompanying drawings, in which.

Figure 1:
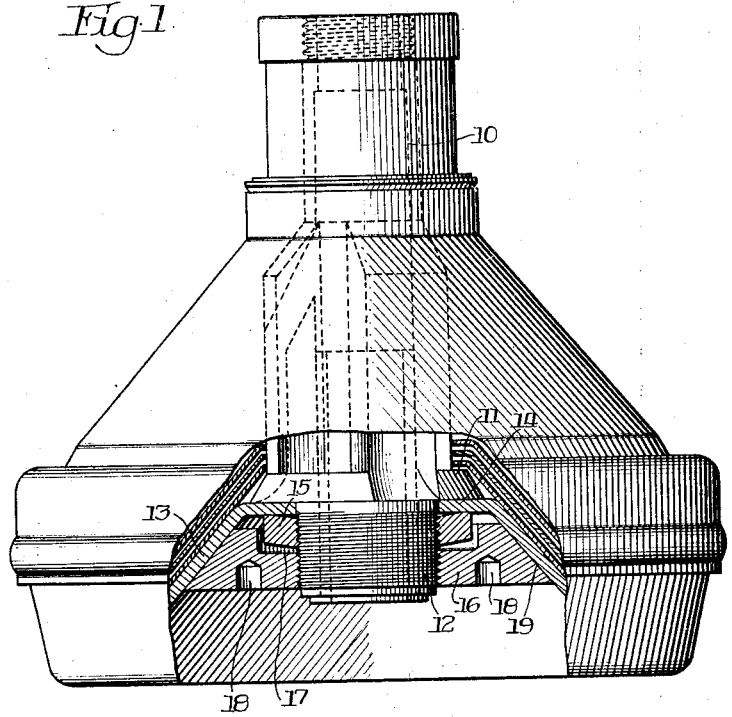
Figure 1 is an elevational view partly in section of a bowl assembly embodying the features of the invention.
Figure 2:
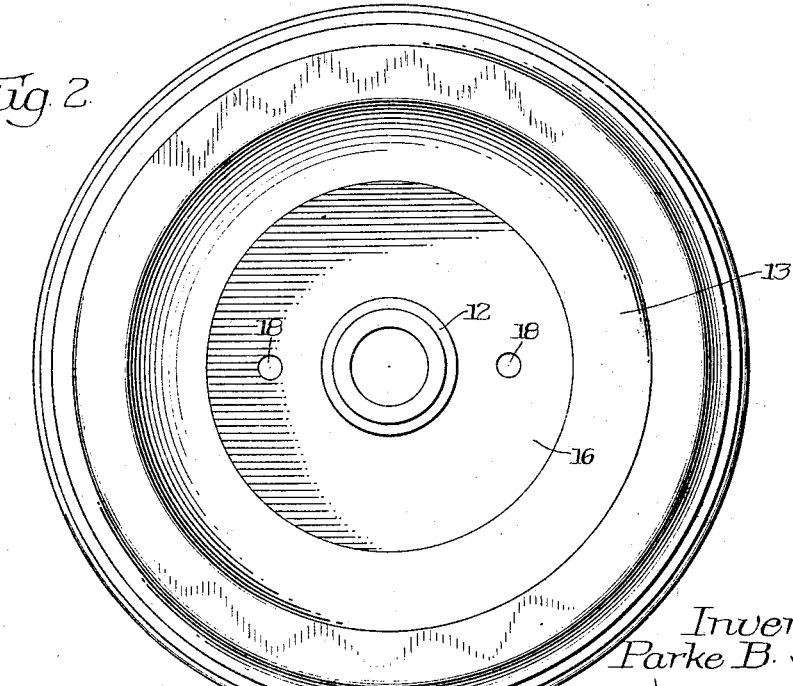
Figure 2 is a bottom view of the assembly.

While the invention is susceptible of various modifications and alternate constructions, I have shown in the drawings and will herein describe in detail the preferred embodiment, but it is to be understood that I do not thereby intend to limit the invention to the specific form disclosed but intend to cover all modifications and alternative constructions falling within the spirit and scope of the invention as expressed in the appended claims.

In a centrifugal separator, a bowl assembly is provided, in which the separation takes place, and which is adapted to be seated upon and driven by a vertical drive shaft rotated at a relatively high speed. The bowl assembly includes generally a central stem adapted to be seated upon and form a driving connection with the drive shaft, and a bowl rigidly secured to said stem.

In the drawings, a tubular stem 10 is shown, which has a downwardly facing shoulder 11 formed adjacent the lower end thereof and a threaded portion 12 below the shoulder 11.

The bowl comprises a conical base 13 and an inturned annular flange 14 which fits snugly around the stem 10 and against the shoulder 11. A locking nut 15 having a concave bearing face is turned onto the threaded portion 12 of the stem and securely clamps the flange 14 against the shoulder 11. On the lower end of the threaded portion 12, a supporting nut 16 is screwed, which nut has a cup 17 formed in its upper face to fit around the locking nut 15 and holes 18 in its lower face by which it may be tightened on a bowl vise (not shown). The supporting nut 16 is formed with a conical periphery 19 which bears against the conical base 13 of the bowl to stiffen the bowl and hold it rigidly in a centered position.

From the above description it is apparent that I have provided a novel bowl assembly in which the bowl is securely clamped to the stem by the locking nut and is rigidly held in a centered position and stiffened by the supporting nut so that there will be no distortion or danger of the parts becoming separated when the assembly is rotated at a high speed.

I claim as my invention:

1. In a centrifugal separator, a bowl assembly comprising, in combination, a stem having a downwardly facing shoulder and a threaded portion below said shoulder, a bowl having a conical base with an inturned annular flange fitting snugly around said stem and against said shoulder, a locking nut threaded to said stem and clamping said flange against said shoulder, and a supporting nut threaded to said stem below said locking nut and having a conical periphery bearing against the conical base of said bowl to stiffen the bowl and hold it rigidly centered.

2. In a centrifugal separator, a bowl assembly comprising, in combination, a tubular stem adapted to be seated upon and enclose the upper end of a vertical drive shaft, a downwardly facing shoulder formed on said stem adjacent the lower end thereof, a bowl having a conical base with an inturned annular flange fitting snugly around said stem and against said shoulder, a locking nut threaded to the lower end of said stem and clamping said flange against said shoulder, and a supporting nut threaded to said stem below said locking nut and having a cup formed in its upper face fitting around said locking nut, said supporting nut having a conical periphery bearing against the conical base of said bowl to stiffen the bowl and hold it rigid.

3. In a centrifugal separator, a bowl assembly comprising, in combination, a stem adapted to be seated upon the upper end of a vertical drive shaft, a bowl fitting around said stem and having a conical base, a nut threaded to said stem and having a conical periphery bearing against the conical base of said bowl to stiffen the bowl and hold it rigidly centered relative to said stem, and means independent of said nut for axially clamping said bowl to said stem.

In testimony whereof, I have hereunto affixed my signature.

PARKE B. SHEE.